(12) United States Patent
Moore

(10) Patent No.: US 6,871,273 B1
(45) Date of Patent: Mar. 22, 2005

(54) PROCESSOR AND METHOD OF EXECUTING A LOAD INSTRUCTION THAT DYNAMICALLY BIFURCATE A LOAD INSTRUCTION INTO SEPARATELY EXECUTABLE PREFETCH AND REGISTER OPERATIONS

(75) Inventor: Charles Robert Moore, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 516 days.

(21) Appl. No.: 09/598,436

(22) Filed: Jun. 22, 2000

(51) Int. Cl.[7] .............................................. G06F 9/00
(52) U.S. Cl. ...................................................... 712/207
(58) Field of Search ......................................... 712/207

(56) References Cited

U.S. PATENT DOCUMENTS

| | | | |
|---|---|---|---|
| 5,377,336 A | * 12/1994 | Eickemeyer et al. | 712/207 |
| 5,396,604 A | * 3/1995 | DeLano et al. | 712/207 |
| 5,694,568 A | 12/1997 | Harrison, III et al. | |
| 5,889,985 A | * 3/1999 | Babaian et al. | 712/225 |
| 5,931,957 A | * 8/1999 | Konigsburg et al. | 714/48 |
| 5,948,095 A | * 9/1999 | Arora et al. | 712/200 |
| 6,192,515 B1 | * 2/2001 | Doshi et al. | 717/161 |
| 6,401,193 B1 | * 6/2002 | Afsar et al. | 712/207 |

OTHER PUBLICATIONS

Chen and Baer, "Effective Hardware–Based Data Prefetching for High–Performance Processors," 1993, pp. 609–623.*
IBM Technical Disclosure Bulletin, vol. 38, No. 06, Jun. 1995, "Methods of Specifying Data Prefetching without using a Separate Instruction", pp.355–356.*
Tanenbaum, "Structured Computer Organization, 2nd Edition", 1984, p. 11.*

Callahan et al., "Software Prefetching," Rice University, 1991, pp. 40–52.*

* cited by examiner

Primary Examiner—Eddie Chan
Assistant Examiner—David J. Huisman
(74) Attorney, Agent, or Firm—Volel Emile; Mark S. Walker; Dillon & Yudell LLP

(57) ABSTRACT

A processor implementing an improved method for executing load instructions includes execution circuitry, a plurality of registers, and instruction processing circuitry. The instruction processing circuitry fetches a load instruction and a preceding instruction that precedes the load instruction in program order, and in response to detecting the load instruction, translates the load instruction into separately executable prefetch and register operations. The execution circuitry performs at least the prefetch operation out-of-order with respect to the preceding instruction to prefetch data into the processor and subsequently separately executes the register operation to place the data into a register specified by the load instruction. In an embodiment in which the processor is an in-order machine, the register operation is performed in-order with respect to the preceding instruction.

14 Claims, 3 Drawing Sheets

PROCESSOR AND METHOD OF EXECUTING A LOAD INSTRUCTION THAT DYNAMICALLY BIFURCATE A LOAD INSTRUCTION INTO SEPARATELY EXECUTABLE PREFETCH AND REGISTER OPERATIONS

BACKGROUND OF THE INVENTION

1. Technical Field

The present invention relates in general to data processing and, in particular, to a processor and method of performing load operations in a processor. Still more particularly, the present invention relates to a processor and method of processing a load instruction that bifurcate load execution into two separate operations.

2. Description of the Related Art

Most processors' instruction set architectures (ISAs) include a load or similar type of instruction that, when executed, causes the processor to load specified data from memory (e.g., cache memory or system memory) into the processor's internal registers. Conventional processors handle the execution of load instructions in one of two ways. First, a processor may execute load instructions strictly in program order. In general, the execution of load instructions with strict adherence to program order is viewed as disadvantageous given the fact that at least some percentage of data specified by load instructions will not be present in the processor's cache. In such cases, the processor must stall the execution of the instructions following the load until the data specified by the load is retrieved from memory.

Alternatively, a processor may permit load instructions to execute out-of-order with respect to the programmed sequence of instructions. In general, out-of-order execution of load instructions is viewed as advantageous since operands required for execution are obtained from memory as soon as possible, thereby improving overall processor throughput. However, supporting out-of-order execution of load instructions entails additional complexity in the processor's architecture since, to guarantee correctness, the processor must be able to detect and cancel an out-of-order load instruction that loads data from a memory location targeted by a later-executed store instruction (executed in the same or a remote processor) preceding the load instruction in program order.

SUMMARY OF THE INVENTION

The present invention addresses the poor performance associated with in-order processors and eliminates much of the complexity associated with out-of-order machines by providing an improved processor and method of executing load instructions.

In accordance with the present invention, a processor implementing an improved method for executing load instructions includes execution circuitry, a plurality of registers, and instruction processing circuitry. The instruction processing circuitry fetches a load instruction and a preceding instruction that precedes the load instruction in program order, and in response to detecting the load instruction, translates the load instruction into separately executable prefetch and register operations. The execution circuitry performs at least the prefetch operation out-of-order with respect to the preceding instruction to prefetch data into the processor and subsequently separately executes the register operation to place the data into a register specified by the load instruction. In an embodiment in which the processor is an in-order machine, the register operation is performed in-order with respect to the preceding instruction.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
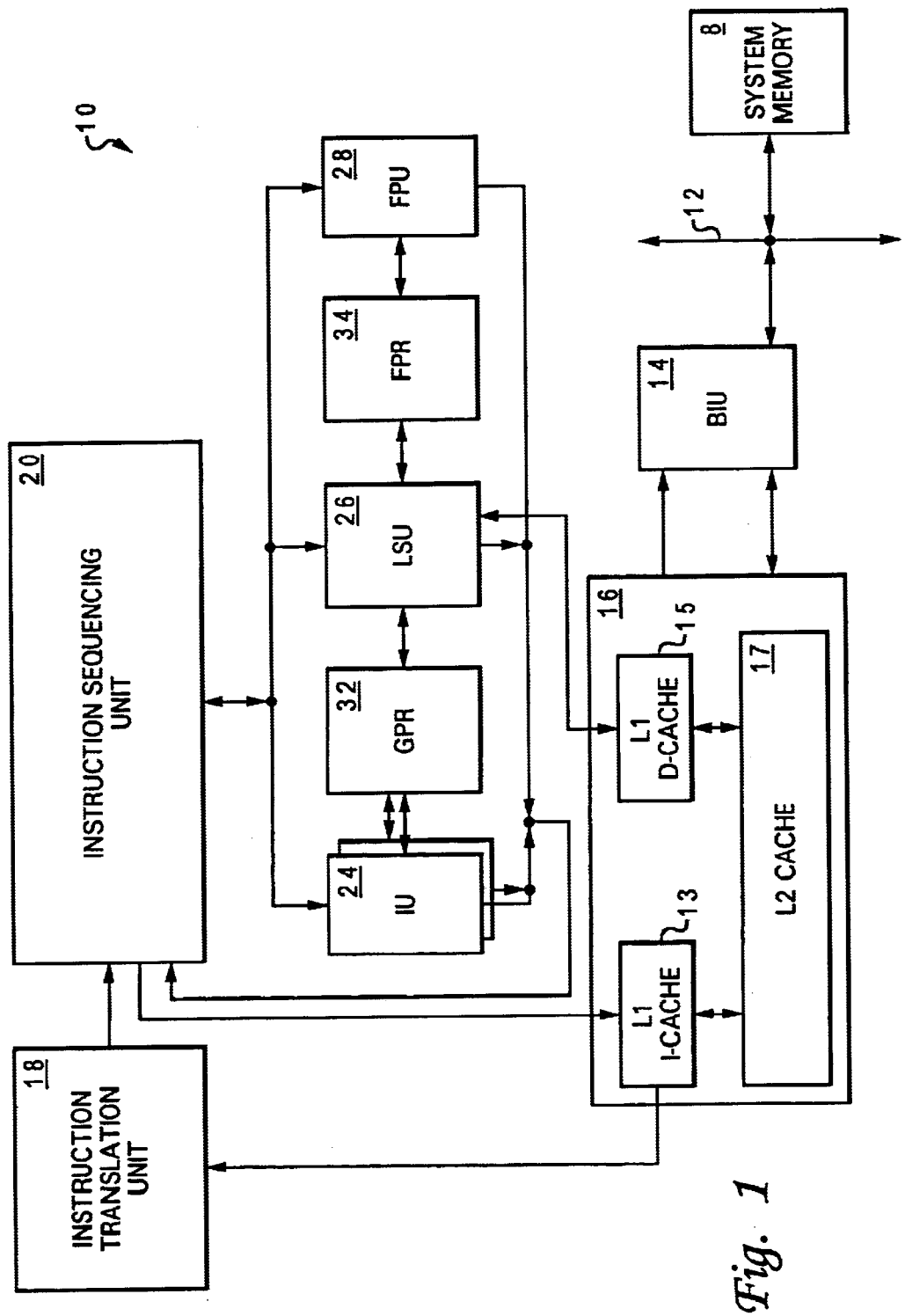
FIG. 1 depicts an illustrative embodiment of a data processing system with which the method and system of the present invention may advantageously be utilized.

With reference now to the figures and in particular with reference to FIG. 1, there is illustrated a block diagram of an exemplary embodiment of a data processing system with which the present invention may advantageously be utilized. As shown, the data processing system includes at least one processor, indicated generally at 10, which, as discussed further below, includes various execution units, registers, buffers, memories, and other functional units that are all formed within a single integrated circuit. Processor 10 is coupled by a bus interface unit (BIU) 14 to a bus 12 and other components of the data processing system, such as system memory 8 or a second processor 10 (not illustrated).

Processor 10 includes an on-chip multi-level cache hierarchy 16 that provides low latency access to cache lines of instructions and data that correspond to memory locations in system memory 8. In the depicted embodiment, cache hierarchy 16 includes separate level one (L1) instruction and data caches 13 and 15 and a unified level two (L2) cache 17. An instruction sequencing unit (ISU) 20 requests instructions from cache hierarchy 16 by supplying effective addresses (EAs) of cache lines of instructions. In response to receipt of an instruction request, cache hierarchy 16 translates the provided EA into a real address and outputs the specified cache line of instructions to instruction translation unit 18. Instruction translation unit 18 then translates each cache line of instructions from a user instruction set architecture (UISA) into a possibly different number or internal ISA (IISA) instructions that are directly executable by the execution units of processor 10. The instruction translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions.

Following instruction translation by ITU 18, ISU 20 temporarily buffers the IISA instructions until the instructions can be dispatched to one of the execution units of processor 10 for execution. In the illustrated embodiment, the execution units of processor 10 include integer units (IUs) 24 for executing integer instructions, a load-store unit (LSU) 26 for executing load and store instructions, and a floating-point unit (FPU) 28 for executing floating-point instructions. Each of execution units 24–28 is preferably implemented as an execution pipeline having a number of pipeline stages.

During execution within one of execution units 24–28, an instruction receives operands (if any) from, and stores data results (if any) to one or more registers within a register file coupled to the execution unit. For example, IUs 24 execute integer arithmetic and logic instructions by reference to general-purpose register (GPR) file 32, and FPU 28 executes floating-point arithmetic and logic instructions by reference to floating-point register (FPR) file 34. LSU 26 executes load and store instructions to transfer data between memory (e.g., cache hierarchy 16) and either of GPR file 32 and FPR file 34. After an execution unit finishes execution of an instruction, the execution unit notifies instruction sequencing unit 20, which schedules completion of the instruction in program order. Upon completion of an instruction, the data results, if any, of the instruction form a portion of the architected state of processor 10, and execution resources allocated to the instruction are made available for use in the execution of a subsequent instruction.

As noted above, much of the hardware and data flow complexity involved in processing load instructions in conventional processors is attributable to the execution of load and other instructions out-of-program order. In particular, the design philosophy of many conventional processors that permit out-of-order execution of instructions is to execute load instructions as early as possible to place specified data into a register file so that subsequent instructions having a dependency upon the load data are less likely to stall due to memory access latency. The processor must then detect data hazards (e.g., store instructions targeting the same address that are earlier in program order, but later in execution order) with respect to the data and discard the load data from the register file (and instructions executed utilizing that load data) in the event that the load data is found to be stale.

In accordance with the present invention, processor 10 simplifies the processing of UISA load instructions by translating at least some of these UISA load instructions into two separately executable IISA instructions. These two IISA instructions are defined herein as a PREFETCH instruction that, if necessary, causes specified data to be prefetched from lower level memory (e.g., L2 cache 17 or system memory 8) into L1 data cache 15 and a REGISTER instruction that transfers data specified by the UISA load instruction into a register file.

Figure 2A:
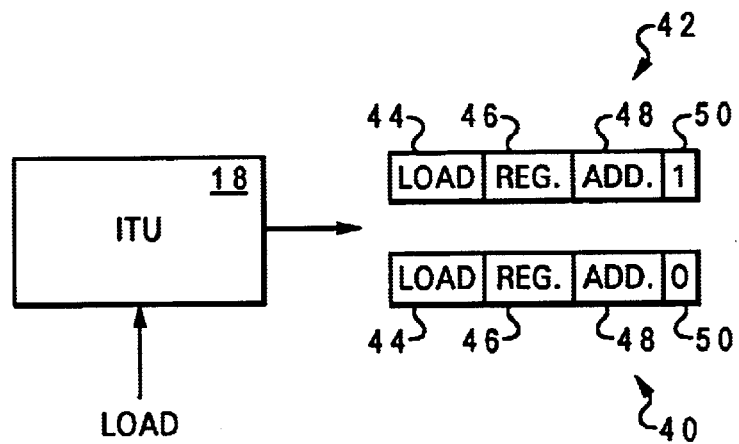
FIGS. 2A and 2B illustrate two alternative embodiments of the translation of UISA load instructions into separately executable PREFETCH and REGISTER operations in accordance with the present invention.
Figure 2B:
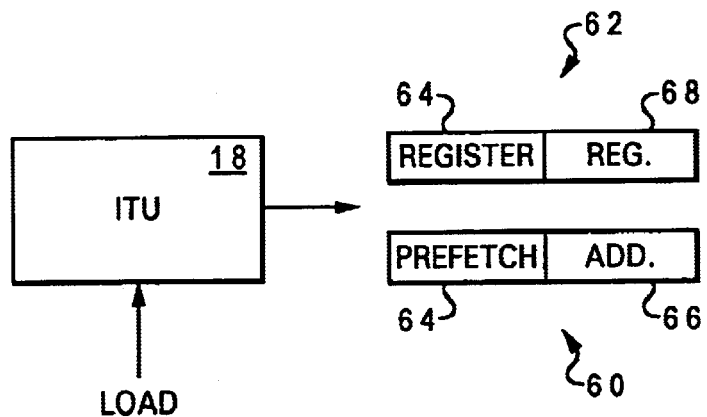

Referring now to FIGS. 2A and 2B, there are depicted two alternative embodiments of the translation of UISA load instructions into separately executable PREFETCH and REGISTER instructions in accordance with the present invention. As illustrated in FIG. 2A, in a first embodiment, ITU 18 translates UISA load instruction into two IISA LOAD instructions 40 and 42 that are identical except for the value of a register operation field 50. Thus, while LOAD instructions 40 and 42 have matching opcode, register, and address fields 44, 46 and 48, register field 50 of LOAD instruction 40 is reset to 0 to indicate a PREFETCH operation, and register field 50 of LOAD instruction 42 is set to 1 to indicate a REGISTER operation. A variation on this embodiment that could be implemented with or without instruction translation by ITU 18 would be for a single LOAD instruction to be supplied to ISU 20, and for ISU 20 to issue the LOAD instruction twice for execution (e.g., from an instruction buffer) with differing settings of register field 50.

Alternatively, as shown in FIG. 2B, ITU 18 may translate a UISA load instruction into distinct IISA prefetch and register instructions 60 and 62, respectively. As illustrated, IISA PREFETCH instruction 60 contains, in addition to an opcode field 64, at least a target address field 66 identifying operands that may be utilized to compute the memory address(es) from which load data is to be retrieved. IISA REGISTER instruction 62, by contrast, has a different opcode specified in its opcode field 64 and specifies in a register field 68 the register(s) into which the load data are to be transferred.

By translating UISA instructions to IISA instructions in this manner, memory access latency associated with load instructions can be masked as in complex out-of-order machines, even in processors of reduced complexity that execute instructions either in-order or only slightly out-of-order. As an example, an exemplary cache line of instructions fetched from cache hierarchy 16 may include the following UISA instructions:

ADD1
SUB1
MUL1
MUL2
ST
SUB2
LD
ADD2 where ADD1 is the earliest UISA instruction in program order, LD is a UISA load instruction, and ADD2 is the latest instruction in program order and is an addition instruction dependent upon the load data. According to the embodiment depicted in FIG. 2B, these UISA instructions may be translated into the following sequence of IISA instructions:

ADD1
SUB1
MUL1
MUL2
ST
SUB2
PRE
REG
ADD2 where PRE and REG denote separately executable IISA PREFETCH and REGISTER instructions, respectively.

If instruction sequencing unit 20 enforces in-order execution, which is defined to mean that no instruction that changes the state of an architected register can be executed prior to an instruction preceding it in program order, processor 10 can still enjoy the chief benefits of executing load instructions out-of-order, that is, masking memory access latency, without the concomitant complexity by speculatively executing the IISA PREFETCH instruction prior to at least one instruction preceding it in program order. In this manner, cache hierarchy 16 can speculatively initiate prefetching of the load data into L1 data cache 15 to mask data access latency, while the REGISTER instruction (which alters the architected state of processor 10) is still performed in-order. Table I summarizes an exemplary execution scenario, given the IISA instruction stream discussed above and an embodiment of processor 10 in which ISU 20 is capable of dispatching and retiring two instructions per cycle.

TABLE 1

| | Cycle 1 | Cycle 2 | Cycle 3 | Cycle 4 | Cycle 5 | Cycle 6 | Cycle 7 |
|---|---|---|---|---|---|---|---|
| ADD1 | D | X | C | | | | |
| PRE | D | X | | pre-fetch data to L1 data cache | | | |
| SUB1 | | D | X | C | | | |
| MUL1 | | D | X | C | | | |
| MUL2 | | | D | X | C | | |
| ST | | | D | X | C | | |
| SUB2 | | | | D | X | C | |
| REG | | | | D | X | C | |
| ADD2 | | | | | D | X | C |

In the exemplary scenario depicted in Table I, at the beginning of cycle 1, ISU 20 holds all nine of the IISA instructions, for example, in a deep instruction buffer that is preferably more than one cache line of instructions in depth. In response to detecting a PRE instruction available for dispatch in the instruction buffer, ISU 20 dispatches the PRE instruction out-of-20 order to LSU 26, for example, concurrent with the dispatch of ADD1 to IU 24.

During cycle 2, ISU 20 also decodes and dispatches the SUB1 and MUL1 instructions to IUs 24. Meanwhile, IU 24 executes ADD1, and LSU 26 executes the PRE instruction to calculate a speculative effective address (EA) of the data to be loaded. This speculative EA is then translated to a real address, for example, by reference to a conventional data translation lookaside buffer (TLB), and supplied to cache hierarchy 16 as a prefetch request. Thus, if the real address hits in L1 data cache 15, then no further action is taken. However, if the real address misses in L1 data cache 15, then the real address will be furnished to L2 cache 17 as a request address. In the event of a hit in L2 cache 17, L2 cache 17 will load the associated data into L1 data cache 15; however, if the real address misses in L2 cache 17, then a request containing the real address will be sourced onto data bus 12 for servicing by system memory 18 or another processor 10. Thus, execution of the PREFETCH instruction triggers prefetching of data into cache hierarchy 16 (and preferably L1 data cache 15) that is likely to be loaded into a register file in response to execution of a REGISTER instruction. This prefetching is speculative, however, in that an intervening branch instruction may redirect the execution path, resulting in the REGISTER instruction not being executed. In addition, the contents of the registers utilized to compute the EA of the load data may be updated by an instruction executed between the PRE instruction and the associated REG instruction. However, because the PRE instruction merely affects the cache contents rather than the architected state of processor 10, no corrective action need be taken in the event of mis-speculation.

Next, in cycle 3, ISU 20 completes the ADD1 instruction, and its result data become part of the architected state of processor 10. As further shown in Table I, the SUB1 and MUL1 instructions are executed by IUs 24, and the MUL2 and ST instructions are decoded and dispatched to IU 24 and LSU 26, respectively.

Assuming that the prefetch request missed in L1 data cache 15 and hit in L2 data cache 17, during cycle 4 a copy of the prefetch data is loaded from L2 data cache 17 into L1 data cache 15. The MUL2 and ST instructions are also executed by an IU 24 and LSU 26, respectively. In addition, ISU 20 completes the SUB1 and MUL1 instructions and decodes and dispatches the SUB2 and REG instructions to an IU 24 and LSU 26, respectively. Thus, as required by the in-order architecture of processor 10, the REG instruction, which affects the architected state of processor 10 is dispatched, executed and completed no earlier than SUB2, the instruction preceding it in program order.

Next, in cycle 5, the MUL2 and ST instructions are completed by ISU 20, and the SUB2 and REG instructions are executed by an IU 24 and LSU 26, respectively. To execute the REG instruction, LSU 26 computes the EA of the load data and supplies the EA to cache hierarchy 16, which translates the EA to a real address and determines whether the load data associated with that real address is resident in L1 data cache 15. Because of the earlier speculative execution of the PRE instruction, in most cases the load data is resident in L1 data cache 15, and the REG instruction can both execute and load data into one of register files 32 or 34 in the minimum data access latency permitted by cache hierarchy 16, which in this case is a single cycle.

Thereafter, in cycle 6, the ADD2 instruction, which is dispatched in cycle 5, is executed by one of IUs 24 concurrent with the completion of the SUB2 and REG instructions by ISU 20. As illustrated, because the PRE instruction speculatively prefetches the data required for the ADD2 instruction prior to execution of the REG instruction, the ADD2 instruction, which is dependent upon the load data, is permitted to execute without any latency. Finally, ISU 20 completes the ADD2 instruction during cycle 7.

Figure 4:
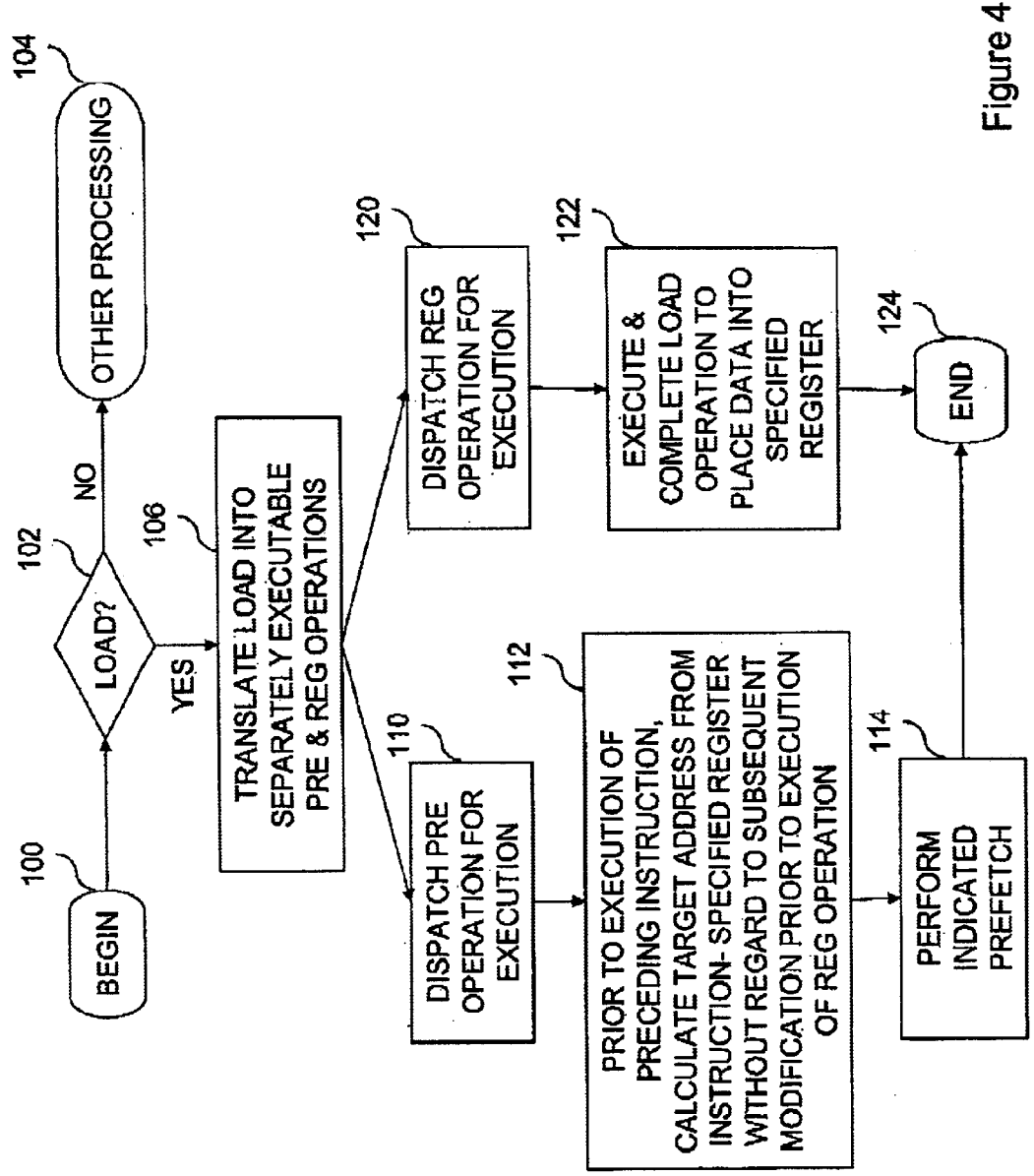
FIG. 4 is a high level logical flowchart of the processing of a load instruction in accordance with at least one embodiment of the present invention.

FIG. 4 is a high level logical flowchart of the above-described process by which a processor processes a UISA load instruction as separately executable IISA PREFETCH and REGISTER instructions. As shown, the process begins at block 100 and thereafter proceeds to block 102, which depicts ITU 18/ISU 120 translating UISA load instruction into two, separately executable IISA PRE and REG (or LOAD) instructions. Next, as shown in cycle 1 of Table I and at block 110 of FIG. 4, ISU 20 detects the PRE instruction and dispatches the PRE instruction out-of-order with respect to a preceding instruction to LSU 26.

As depicted at block 112, during cycle 2, LSU 26 executes the PRE instruction to calculate a speculative target address (EA) of the data to be loaded without regard as to whether the contents of the register(s) utilized to compute the target address of the load data may be updated by an instruction executed between the PRE instruction and the associated REG instruction. This target address is then utilized at block 114 to speculatively prefetch data associated with the speculative target address into cache (e.g., L1 data cache 15). Processing of the PRE instruction thereafter terminates at block 124.

Referring now to block 120, during cycle 4, ISU 20 decodes and dispatches the REG instruction to LSU 26. Net, as illustrated at block 122, the REG instruction is executed by LSU 26 in cycle 5 and thereafter is completed. As noted above, to execute the REG instruction, LSU 26 computes the EA of the load data and supplies the EA to cache hierarchy 16, which translates the EA to a real address and determines whether the load data associated with that real address is resident in L1 data cache 15. Because of the earlier speculative execution of the PRE instruction, in most cases the load data is resident in L1 data cache 15, and the REG instruction can both execute and load data into one of register files 32 or 34 in the minimum data access latency permitted by cache hierarchy 16. Following block 122, the process ends at block 124.

It should be evident to those skilled in the art that various modifications of the exemplary processor described herein are possible and may be desirable, depending upon other architectural considerations. For example, it may be desirable for instruction translation unit 18 to be merged into ISU 20. In addition, it may be desirable for a processor in accordance with the present invention to permit out-of-order execution of instructions other than memory access instructions (e.g., loads and stores), while requiring memory access instructions to be executed strictly in order. In general, permitting non-memory-access instructions to execute out-of-order would not introduce any additional complexity as compared to in-order execution since conventional in-order processors include logic for detecting and observing register data dependencies between instructions. Moreover, a processor in accordance with the present invention may chose to execute the PRE instruction by speculatively loading the data into buffer storage, rather than merely "priming" the cache hierarchy with a prefetch address. Buffering speculatively fetched load data in this manner is permitted even by in-order machines in that the content of the register files is not affected.

Figure 3:
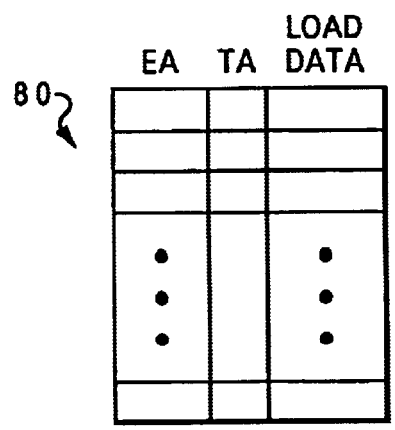
FIG. 3 is an exemplary load data queue that may be utilized to temporarily buffer load accordance with the present invention.

For example, FIG. 3 illustrates a load data queue 80 within LSU 26 that may se utilized to temporarily buffer load data received from cache hierarchy 16 in response to execution of a PREFETCH instruction. As shown, each entry of load data queue 80 associates load data retrieved from cache hierarchy 16 with the target address (TA) from which the load data was retrieved and the EA of the UISA load instruction, which is shared by and flows through processor 10 in conjunction with each of the PREFETCH and REGISTER IISA instructions. Thus, when LSU 26 subsequently executes a REG instruction, the EA of the UISA load instruction (and thus the IISA REG instruction) forms an index into load data queue 80 and the TA provides verification that the speculatively calculated target address was correct. Although implementing a load data queue such as that depicted in FIG. 3 may reduce access latency in some implementations, the improvement in access latency entails additional complexity in that store operations and exclusive access requests by other processors must be snooped against the load data queue to ensure correctness.

In another embodiment of the present invention, it may be desired to permit the PREFETCH instruction to be issued and executed as early as possible, but still constrain the PREFETCH instruction to be executed without utilizing speculative address operands. That is, when dispatching instructions, ISU 20 would still advance the PREFETCH instruction as far as possible in execution order with respect to the REGISTER instructions, but processor 10 would enforce register data dependencies so that PREFETCH instructions would always use correct (i.e., non-speculative) register values when computing the prefetch address.

As has been described, the present invention provides an improved processor and method of performing load operations that translate UISA load operations into separately executable prefetch and register operations. Because performing the prefetch operation does not affect the architected state of a processor, the prefetch operation can be performed speculatively to mask data access latency, even in in-order execution machines. The register operation can thereafter be performed in-order to complete the load operation.

While the invention has been particularly shown and described with reference to a preferred embodiment, it will be understood by those skilled in the art that various changes in form and detail may be made therein without departing from the spirit and scope of the invention.

What is claimed is:

1. A processor, comprising:

a plurality of registers;

instruction processing circuitry that fetches an instruction sequence for execution, said instruction sequence including a load instruction and a preceding instruction that precedes said load instruction in program order, wherein said instruction processing circuitry, after fetching said instruction sequence for execution and prior to dispatching said load instruction for execution and responsive to detecting said load instruction within said fetched instruction sequence, translates said load instruction into separately executable prefetch and register instructions and thereafter dispatches said prefetch and register instructions for execution;

a request bus coupled to lower level memory; and execution circuitry coupled to said request bus and coupled to receive dispatched instructions including sand prefetch, register, and preceding instructions from said instruction processing circuitry, wherein said execution circuitry executes at least said prefetch instruction out-of-order with respect to said preceding instruction to prefetch data and subsequently separately executes said register instruction to place said data into a register among said plurality of registers specified by said load instruction, wherein said execution circuitry executes said prefetch instruction by calculating a speculative target memory address utilizing contents of at least one register identified by said prefetch instruction, without regard for whether said contents will be modified between calculation of said speculative target memory address and execution of said register instruction, and by thereafter initiating a fetch, via said request bus, of said data from a memory location associated with said speculative target memory address.

2. The processor of claim 1, wherein said execution circuitry executes said register instruction in-order with respect to said preceding instruction.

3. The processor of claim 1, wherein said execution circuitry executes said register instruction out-of-order with respect to said preceding instruction.

4. The processor of claim 1, wherein said execution circuitry stores said data prefetched in response to said prefetch instruction in a temporary register.

5. The processor of claim 1, and further comprising a data hazard detector that, in response to detection of a hazard for said data, signals said protest to discard said data and said register instruction.

6. The processor of claim 1, wherein said prefetch and register instructions have a same operation code.

7. The processor of claim 6, wherein said prefetch and register instructions specify a same target register for said data and differ only in a value of a register operation field.

8. A method, said method comprising:

fetching an instruction sequence for execution, said instruction sequence including a load instruction and a preceding instruction that precedes said load instruction in program order;

in response to fetching said instruction sequence for execution and prior to execution of said load instruction, instruction processing circuitry detecting said load instruction within said fetched instruction sequence and translating said load instruction into separately executable prefetch and register instructions;

after the translating, the instruction processing circuitry dispatching the preceding instruction and the prefetch and register instructions for execution;

execution circuitry receiving the dispatched preceding instruction and the prefetch and register instructions from the instruction processing circuitry;

in response to receiving the dispatched prefetch instruction, the execution circuitry executing at least said prefetch instruction out-of-order with respect to said preceding instruction to prefetch data, wherein executing said prefetch instruction comprises:

the execution circuitry calculating a speculative target memory address utilizing contents of at least one register identified by the prefetch instruction without regard for whether said contents will be modified between calculation of said speculative target memory address and execution of said register instruction; and thereafter the execution circuitry initiating a fetch via, a request bus coupled to lower level memory, of said data from a memory location associated with said speculative target memory address; and thereafter, the execution circuitry separately executing said register instruction to place said data into a register specified by said load instruction.

9. The method of claim 8, and further comprising executing said register instruction in-order with respect to said preceding instruction.

10. The method of claim 8, and further comprising executing said register instruction out-of-order with respect to said preceding instruction.

11. The method of claim 8, wherein performing said prefetch comprises storing said data in a temporary register.

12. The method of claim 8, and further comprising:

detecting a data hazard for said data; and in response to detection of said hazard for said data, discarding said data and said register instruction.

13. The method of claim 8, wherein translating said load instruction comprises translating said load instruction into prefetch and register instructions having a same operation code.

14. The method of claim 13, wherein said prefetch and register instructions specify a same target register for said data and differ only in a value of a register operation field.

* * * * *